Dec. 16, 1930.  R. W. HACKETT ET AL  1,785,696
BORDER SEAL FOR LAMINATED GLASS
Filed May 25, 1928
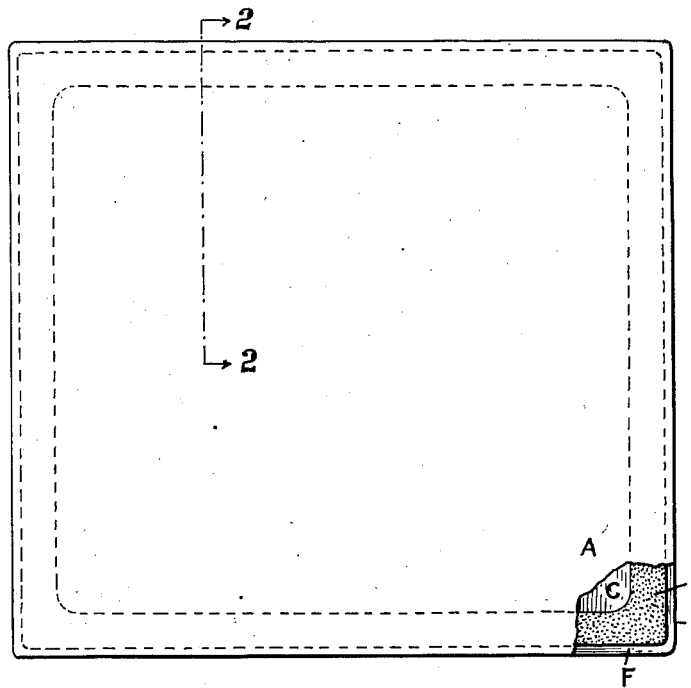
FIG.1
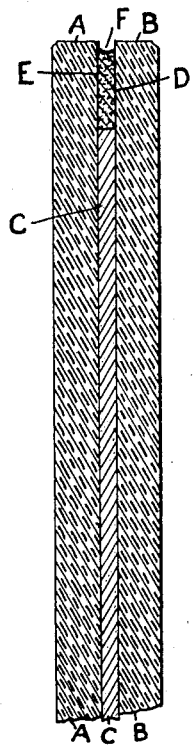
FIG.2
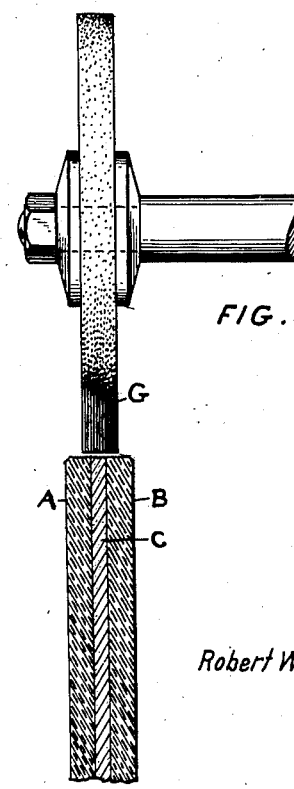
FIG.3
Inventors.
Robert W. Hackett and Arthur G. Worrall.

Patented Dec. 16, 1930

1,785,696

UNITED STATES PATENT OFFICE

ROBERT W. HACKETT, OF UPPER DARBY, AND ARTHUR G. WORRALL, OF PHILADELPHIA, PENNSYLVANIA, ASSIGNORS TO LOUIS J. KOLB, TRADING AS SAFETEE GLASS COMPANY, OF PHILADELPHIA, PENNSYLVANIA

BORDER SEAL FOR LAMINATED GLASS

Application filed May 25, 1928. Serial No. 280,518.

Our invention has for its object the provision of a border seal for laminated glass which will prevent the entrance of air, gases and moisture to the celluloid or binding material between the glass sheets, the entrance of which has a tendency to cause a separation between the glass and the celluloid or binding material and thereby provide structural defects which impair the safety feature of the glass as well as causing discolorations which in time extend inward from the border to such an extent as to impair the clearness of the laminated glass structure.

Heretofore, it has been customary to seal the border edge of sheets of laminated glass by coating the said edge with black asphaltum, varnishes and other materials which may be applied thereto as a paint.

In producing our improved laminated glass seal and in practicing the method for producing the same, we proceed as follows: The border edges of the laminated glass are subjected to the action of a fine wire foundry brush rotating at a high speed, the result of which is to cut and remove the celluloid or pyroxylin binder between the edges of the glass sheets to form a groove or channel between said glass sheets and without injury to the glass. The depth of the groove is preferably three-thirty-seconds of an inch and its width is equal to the distance between the glass sheets. This channel or groove extends entirely around the border edge of the glass, and is then filled with a sealing mixture preferably of a metallic nature and of a sufficient density that it will not flow or work out of the groove after once being deposited therein.

In practice, we have found that a sealing compound formed of a metallic powder, held in suspension in a vehicle of a binding character and adhering properties and which further, when forced into the border groove, fills the same and adheres to the inner faces of the glass, is well adapted to the purposes of our invention; and that it will operate to expel any air, moisture, vapors or gases which may be present in the groove at the time of the introduction of the sealing compound and will also exclude the entrance of air, moisture, vapors or gases into the grooved portion of the laminated glass. We prefer to apply the sealing material in a plastic or semi-plastic state under a pressure sufficient to thoroughly fill the groove and forcibly expel the air, moisture, vapors or gases therefrom.

Our invention also consists of improvements hereinafter described, whereby the above objects and results are attained, and which are more fully defined in the claims.

Referring to the drawings: Fig. 1 is a front view of a piece of laminated glass embodying our improved border seal; Fig. 2 is a cross-section of the same, on line 2—2, on a larger scale; and Fig. 3 is a similar cross-section of the laminated glass before the removal of the celluloid or binder to provide the grooved perimeter and showing the wire brush employed in forming the groove, the lower portion of the brush being broken away to show the wire bristles thereof.

A and B represent the two glass sheets which are united by the interposed sheet C of celluloid or pyroxylin compound, which may directly adhere to the glass or be insured connection therewith by first coating the facing glass surfaces with a thin layer of gelatin or other cementing material to form the laminated glass of commerce. For the purposes of our invention, it will suffice that the laminated glass may be composed of two glass sheets respectively united to and on opposite sides of a sheet of celluloid or other pyroxylin material.

A sheet of laminated glass of the foregoing character is then subjected to the abrading or cutting effect of a fine flexible wire foundry brush G revolving at a high speed when the edges of the laminated glass are presented to the perimeter of the brush, as shown in Fig. 3, and during which contact the ends of the brush wires (preferably about 0.006 inch diameter) cut into and remove the celluloid layer or sheet C to the desired extent to provide a groove D of suitable depth (three-thirty-seconds to one-eighth of an inch, for example) between the opposing faces of the glass sheets, as will be understood by reference to Figs. 1 and 2.

When the groove D is so provided and cleaned of all dust particles, it is then filled or substantially filled with a sealing compound E which is waterproof in character and effectually seals the groove and the entire bounding edges or perimeter of the laminated glass sheet against the entrance of gases including air, vapors or moisture; and it is desirable that the filling or sealing means for the groove shall be pliable or plastic, (in cold or warmed condition), so that it may be forced into the grooves by pressure applied mechanically or otherwise. The benefit of applying pressure to the pliable sealing material resides in the fact that it drives out the air or other gases and any vapors or moisture which may be present and, at the same time, be forced into retaining contact with the glass walls of the groove.

The sealing compound may be applied so as to wholly fill the groove, but preferably not quite filling the same, as indicated at F in Fig. 2. We have found it convenient to apply the sealing compound by use of a "gun" (not shown) having a nozzle end fitting the open part of the groove and provided with a piston for applying pressure to the compound within the gun, whereby it is slowly expelled, but no claim is made in this application to such appliance.

The sealing means may, in its simpler form, be a metallic paint of a viscous character, which will quickly set within the groove without objectionable tendency to "run". Such a paint may be composed of powdered aluminum or other metal mixed with a varnish-like carrier or vehicle containing dissolved gums.

A suitable waterproof sealing material may be composed of metallic powder or dust incorporated with a vehicle made from either a gum product or a vegetable oil product, or a combination of both, such as tung oil mixed with a vegetable gum, manipulated mechanically into a putty or a plastic or semi-plastic state, and applied by pressure; or the same may be converted, at time of use, into a fluid or more viscous condition by heat or a solvent and used as a filler for the groove of the laminated glass aforesaid.

A seal of the character here set out improves the appearance of the glass; and as it does not reflect light, there is no detrimental effect upon the vision of a person looking through glass in which such a seal is employed. Some of the special advantages of employing a sealing substance composed of finely divided metallic materials such as aluminum bronze powder, are: that the finely divided metal readily incorporates with the viscous vehicles comprising the vegetable oil and thickening ingredients of a gummy nature so that a product may be provided which may be forcibly introduced into the groove in the perimeter of the laminated glass and assure thereby a sealing construction which is dense and yet pliable to an extent necessary to fill all the spaces within the groove and which will not crack by reason of shrinkage. As the metal in finely divided condition occupies a large portion of the body of the sealing material, it is manifest that it provides a metallic resistant to pliability such as is inherent in varnishes and the like, and yet employs in association a sufficient binder such as the vegetable oil and gummy constituent to give the necessary pliability under pressure to thoroughly fill the groove. The presence of the metallic powder or highly divided metallic ingredient may be likened somewhat to the broken stone ingredients in hydraulic masonry which in hardening retains its resistance against shrinkage and at the same time assures maintenance of a thorough union between the stone in forming the main body of the structure. In other words, the presence of the metallic powder provides a sealing composition which at once resists cracking or shrinking and provides a dense and non-reflecting surface through the glass. The seal is completely protected within the glass and is, therefore, not liable to become cracked. Moreover, because the seal is formed within a groove, the sealing material is not required to become so hard as to be brittle; hence in practice, it sets rapidly but retains a yielding character by never becoming hard to brittleness even in cold weather. Because of this latter quality the sealing material will not crack under concussion.

In this application no claim is made for forming the groove in the perimeter of the laminated glass by the employment of a metallic circular brush through abrading action thereof upon the celluloid of the glass structure and the sealing thereof with a suitable sealing or luting material, as the same forms the subject matter of a divisional application, filed August 5, 1930, and Serial No. 473,186.

We have described our improved method and the article of manufacture produced thereby in connection with apparatus which we deem to be best suited to the requirements of the invention, but we do not restrict or confine ourselves to the minor or secondary details either as to the method of procedure or the means employed in putting it into effect, as variations therein may be resorted to as matters for the skilled artisan and without a departure from the spirit of the invention.

Having now described our invention, what we claim and desire to secure by Letters Patent is:

1. The herein described laminated glass, composed of two sheets of glass having an interposed sheet of celluloid or pyroxylin compound united into a unitary structure, the border edges of the glass sheets extending beyond the celluloid or pyroxylin sheet to provide a groove between the perimeters of the glass sheets, and the groove substantially filled with a sealing substance which comprises a powdered metallic base suspended in an adhering vehicle of a plastic character capable of being forced into the groove to be sealed.

2. The herein described laminated glass, composed of two sheets of glass having an interposed sheet of celluloid or pyroxylin compound united into a unitary structure, the border edges of the glass sheets extending beyond the celluloid or pyroxylin sheet to provide a groove between the perimeters of the glass sheets, and the groove substantially filled with a sealing substance which consists of a metal powder incorporated with a viscous vehicle holding and forming with the metal powder a pliable mass, said vehicle composed of gum and oil products.

3. The herein described laminated glass, composed of two sheets of glass having an interposed sheet of celluloid or pyroxylin compound united into a unitary structure, the border edges of the glass sheets extending beyond the celluloid or pyroxylin sheet to provide a groove between the perimeters of the glass sheets, and the groove substantially filled with a sealing substance which consists of an intimate mixture of a metallic bronze and tung oil, together with a thickening ingredient of a gummy nature, said sealing material being pliable at all normal temperatures.

4. The herein described laminated glass, composed of two sheets of glass having an interposed sheet of celluloid or pyroxylin compound united into a unitary structure, the border edges of the glass sheets extending beyond the celluloid or pyroxylin sheet to provide a groove between the perimeters of the glass sheets, and the groove substantially filled with a sealing substance composed of aluminum bronze incorporated with a pliable vehicle consisting of a vegetable oil and a thickening material of a gum nature.

In testimony of which invention, we hereunto set our hands.

ROBERT W. HACKETT.
ARTHUR G. WORRALL.